United States Patent
Sinha et al.

(10) Patent No.: US 8,771,895 B2
(45) Date of Patent: Jul. 8, 2014

(54) ONLINE ANODE PRESSURE BIAS TO MAXIMIZE BLEED VELOCITY WHILE MEETING EMISSION CONSTRAINT

(75) Inventors: Manish Sinha, Pittsford, NY (US); Seth E. Lerner, Honeoye Falls, NY (US); Patrick Frost, Tucson, AZ (US); Victor W. Logan, Naples, NY (US); Balasubramanian Lakshmanan, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 875 days.

(21) Appl. No.: 12/699,773

(22) Filed: Feb. 3, 2010

(65) Prior Publication Data
US 2011/0189573 A1 Aug. 4, 2011

(51) Int. Cl.
*H01M 8/04* (2006.01)
*H01M 8/16* (2006.01)

(52) U.S. Cl.
USPC ........... 429/446; 429/416; 429/428; 429/429; 429/443

(58) Field of Classification Search
USPC .......................... 429/416, 428, 429, 443, 446
See application file for complete search history.

(56) References Cited

U.S. PATENT DOCUMENTS

| | | | | |
|---|---|---|---|---|
| 6,306,531 | B1 * | 10/2001 | Clingerman et al. | 429/416 |
| 6,964,822 | B2 * | 11/2005 | Kobayashi et al. | 429/431 |
| 7,354,669 | B2 * | 4/2008 | Hobmeyr et al. | 429/415 |
| 2009/0269628 | A1 | 10/2009 | Imanishi | |

* cited by examiner

*Primary Examiner* — Patrick Ryan
*Assistant Examiner* — Julian Anthony
(74) *Attorney, Agent, or Firm* — John A. Miller; Miller IP Group, PLC

(57) ABSTRACT

A method that employs a model based approach to determine a maximum anode pressure set-point based on existing airflow in the exhaust gas line. This approach maximizes anode flow channel velocity during bleed events while meeting the hydrogen emission constraint, which in turn increases the amount of water purged from the anode flow channels to increase stack stability.

20 Claims, 2 Drawing Sheets

ONLINE ANODE PRESSURE BIAS TO MAXIMIZE BLEED VELOCITY WHILE MEETING EMISSION CONSTRAINT

BACKGROUND OF THE INVENTION

1. Field of the Invention

This invention relates generally to a method for utilizing an online anode pressure bias to maximize a bleed velocity of an anode of a fuel cell stack while staying within the hydrogen emission constraint and, more particularly, a model based approach to determine the anode pressure set-point based on existing airflow in an exhaust gas line.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange member fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between the two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The MEAs are permeable where nitrogen in the air from the cathode side permeates and collect in the anode side of the stack, referred to in the industry as nitrogen cross-over. Even though the anode side pressure may be higher than the cathode side pressure, the cathode side partial pressures will cause air to permeate through the membrane. Nitrogen in the anode side of the fuel cell stack dilutes the hydrogen such that if the nitrogen concentration increases beyond a certain percentage, such as 50%, the fuel cell stack becomes unstable and may fail. It is known in the art to provide a bleed valve at the anode exhaust gas output of the fuel cell stack to remove nitrogen from the anode side of the stack.

An algorithm may be employed to provide an online estimation of the nitrogen concentration in the anode exhaust gas during stack operation to determine when to trigger the anode exhaust gas bleed. The algorithm may track the nitrogen concentration over time in the anode side of the stack based on the permeation rate from the cathode side to the anode side, and the periodic bleeds of the anode exhaust gas. When the algorithm calculates an increase in the nitrogen concentration above a predetermined threshold, for example 10%, it may trigger the bleed. The bleed is typically performed for a duration that allows multiple stack anode volumes to be bled, thus reducing the nitrogen concentration below the threshold.

The membrane within a fuel cell needs to have a certain relative humidity so that the ionic resistance across the membrane is low enough to effectively conduct protons. This humidification may come from the stack water by-product or external humidification. The flow of hydrogen through the anode gas flow channels has a drying effect on the membrane, most noticeably at an inlet of the hydrogen flow. However, the accumulation of water droplets within the anode gas flow channels from the membrane relative humidity and water by-product could prevent hydrogen from flowing therethrough, and cause the cell to fail because of low reactant gas flow, thus affecting the stack stability. The accumulation of water in the reactant gas flow channels is particularly troublesome at low stack output loads. Anode gas bleeds of nitrogen, in addition to removing excess nitrogen, helps reduce the accumulation of water in the reactant gas flow channels.

One known anode exhaust gas bleed control algorithm determines the duration of the bleed based on a fixed time. Typically, the bleed duration and bleed frequency is determined for different current density ranges of the stack, but which are fixed values through the life of the stack. During an anode bleed event, the rate of hydrogen flow to the exhaust and the resulting velocity in the anode flow channels is a function of the pressure drop across the bleed valve. To ensure that a predetermined hydrogen emission constraint is not violated, for example, 4% total molar flow of hydrogen, the anode pressure is predetermined based on stack current density, assuming nominal airflow, using a look-up table (LUT).

The problem with using a look-up table is that under certain operating conditions, such as low power operation, this approach does not take into account airflow that is bypassing the stack, and thus, provides a lower anode channel flow velocity than is necessary to meet the hydrogen emission constraint. Utilizing the highest anode channel flow velocity possible without violating the hydrogen emission constraint is desirable because the greater the anode channel velocity, the greater the amount of water that is purged from the anode flow channels.

SUMMARY OF THE INVENTION

In accordance with the teachings of the present invention, a method is disclosed that employs a model based approach to determine a maximum anode pressure set-point based on existing airflow in the exhaust gas line. This approach maximizes anode flow channel velocity during bleed events while meeting the hydrogen emission constraint, which in turn increases the amount of water purged from the anode flow channels to increase stack stability.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for determining an online anode pressure bias to maximize an anode bleed velocity while meeting a hydrogen emission constraint is merely exemplary in nature, and is in no way intended to limit the invention or its applications or uses.

Figure 1:
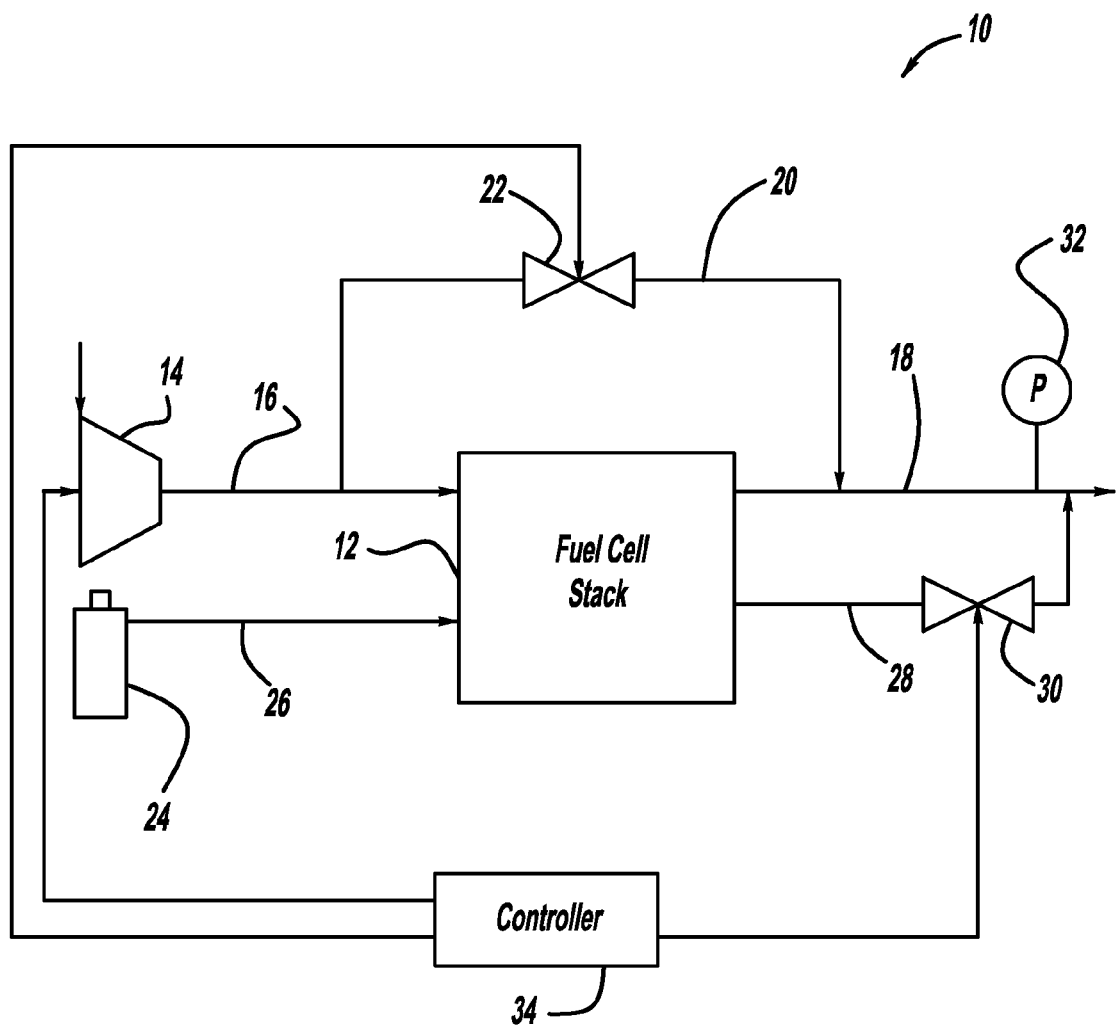
FIG. 1 is a schematic block diagram of a fuel cell system including components for performing an online anode pressure bias to maximize the bleed velocity while meeting the hydrogen emission constraint.

FIG. 1 is a schematic block diagram of a fuel cell system 10 including a fuel cell stack 12. The fuel cell system 10 includes a compressor 14 that provides cathode air to the cathode side of the stack 12 on a cathode input line 16. Cathode exhaust is output from the fuel cell stack 12 on cathode exhaust gas line 18. Cathode exhaust pressure is measured by a pressure sensor 32 in the line 18. A by-pass line 20 is provided around the fuel cell stack 12 and a by-pass valve 22 in the line 20 can be opened to allow the air from the compressor 14 to by-pass the cathode side of the fuel cell stack 12. Hydrogen fuel is provided to the anode side of the fuel cell stack 12 from a hydrogen source 24 on an anode input line 26. Anode exhaust is output from the fuel cell stack 12 on line 28 during anode bleeds when a bleed valve 30 is opened to direct the anode exhaust gas to the line 18. The anode exhaust is thus mixed with air to dilute the hydrogen gas therein.

In certain situations, such as when the fuel cell system 10 goes into a stand-by or idle mode, the by-pass valve 22 is opened to allow cathode air from the compressor 14 to be diverted around the fuel cell stack 12 under low pressure to the cathode exhaust gas line 18. This allows the compressor 14 to operate at its lowest speed without providing cathode air to the stack 12 that is otherwise not needed at low stack current densities and causes a drying effect on the cell membranes. The anode side of the stack 12 is supplied with hydrogen gas at a set-point above the pressure that the compressor air is inducing on the cathode side of the stack 12 so that the anode side pressure is higher than the cathode side pressure.

Instead of using look-up tables based on stack current density, assuming nominal airflow, to ensure that the anode exhaust velocity does not provide an amount of hydrogen that would exceed the hydrogen emission constraint, the system 10 employs a model based approach to determine and maximize the anode pressure set-point, and hence, anode channel flow velocity during the bleed, based on the airflow existing in the exhaust gas line 18. By maximizing the bleed velocity, the system 10 can improve anode flow channel water removal, particularly during extended low power operation.

In one non-limiting embodiment, the anode-cathode differential pressure set-point is calculated using the maximum bleed flow and the total molar flow of the dry cathode exhaust stream to meet the desired emissions target. The bleed to emissions (BTE) algorithm first looks at cathode airflow and estimates the flow rate of hydrogen $y_{H_2}^{exh}$ to ensure the maximum emissions are not exceeded as:

$$y_{H2}^{exh} = \frac{y_{H_2} \cdot \dot{n}_{H_2}}{\dot{n}_{Air} + y_{H_2} \cdot \dot{n}_{H_2}} \leq y_{H2}^{exh\_desired} \quad (1)$$

Where, $y_{H2}^{exh\_desired}$ is the desired emissions, which is a 4.0% molar flow rate or less, $y_{H2}$ is the hydrogen concentration in the anode and $\dot{n}_{Air}$ is the molar flow rate of air in the exhaust gas line 18. Equation (1) is solved to determine the anode bleed flow rate $\dot{n}_{H_2}$.

Next, an orifice flow model is used for the bleed valve 30 to estimate the required anode pressure that provides the bleed flow rate $\dot{n}_{H_2}$. The orifice model is defined as:

$$k_v = 4.633 \cdot n \cdot \sqrt{\frac{MW_n \cdot T}{(p_1^2 - p_2^2)}} \quad (2)$$

Where, $k_v$ is the orifice constant in m³/h, n is the molar flow through the orifice, $MW_n$ is the molecular weight of gas, $p_1$ is the pressure at the inlet of the orifice, $p_2$ is the pressure at the outlet of the orifice and T is the temperature of the orifice.

Equation (2) can be rearranged as equation (3) to solve for the pressure $p_1$ at the inlet of the orifice, which will be the anode pressure set-point $P_a^{SP}$, where the molar flow through the orifice n is the bleed flow rate $\dot{n}_{H_2}$. The anode pressure set-point $P_a^{SP}$ defines the flow of hydrogen from the source 24 that provides the water removal capability.

$$\Delta P_{SP} = \sqrt{p_2^2 + \left(\frac{4.633 \cdot \dot{n}_{H_2}}{k_v}\right)^2 \cdot MW_n \cdot T} - p_2 \quad (3)$$

Figure 2:
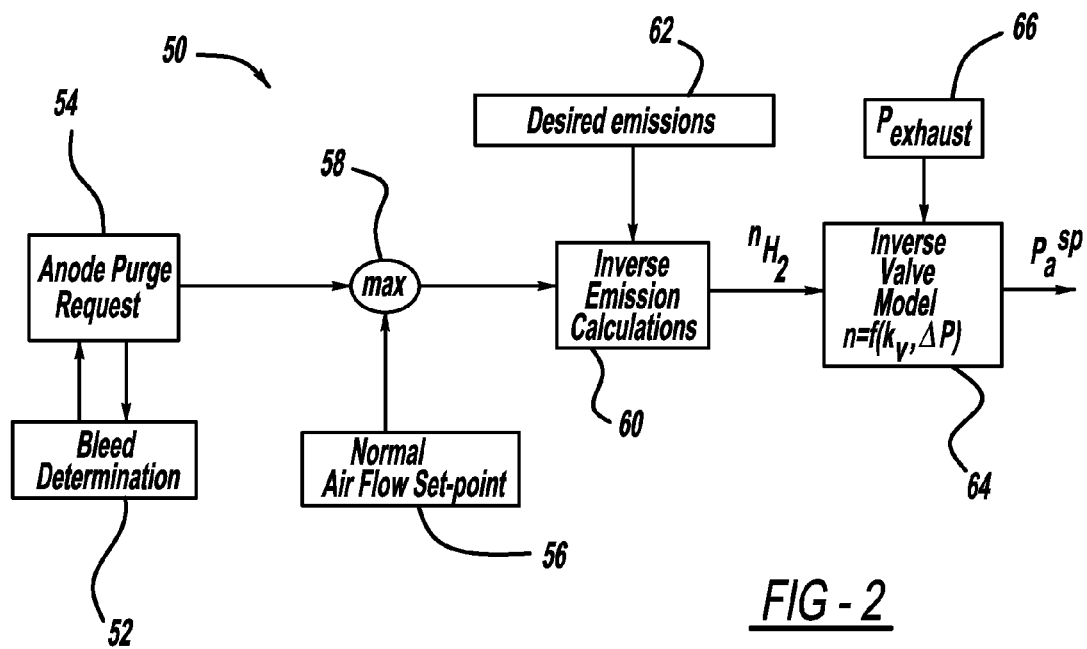
FIG. 2 is a schematic block diagram of a bleed to emission (BTE) algorithm.

FIG. 2 is a schematic block diagram of a system 50 that shows the operation of the BTE algorithm discussed above. The system 50 makes a bleed determination at box 52, which is sent to an anode purge request box 54. The anode purge request at the box 54 provides an airflow command signal that determines how much of the compressor air from the compressor 14 will by-pass the stack 12 through the by-pass valve 22 on the line 20 and how much of the cathode air from the compressor 14 will be sent to the stack 12 on the cathode input line 16 for a particular stack current density. The airflow command signal from the purge request box 64 and an airflow set-point command based on cathode stoichiometry from box 66 are sent to a comparator 58 that determines which command provides the most cathode air on the cathode exhaust line 18. The selected maximum amount of cathode air is output from the comparator 58 as the airflow in the exhaust gas line 18, which is either measured or estimated, as an indication of how much dilution air is available to dilute the hydrogen in the anode exhaust gas line 28.

The airflow in the exhaust gas line 18 is then sent to an inverse emission calculation box 60, along with a desired maximum amount of hydrogen in the anode exhaust at box 62, to calculate the bleed flow rate $\dot{n}_{H_2}$ that determines the bleed flow rate for the amount of air in the exhaust gas line 18. The bleed flow rate signal $\dot{n}_{H_2}$ is then sent to an inverse valve model calculation box 64 along with the pressure signal from the pressure sensor 32 to get the anode pressure set-point $P_a^{SP}$ that determines how much hydrogen can be sent to the stack 12 for a suitable flow through the anode flow channels.

In one non-limiting embodiment, the proposed BTE algorithm also considers increasing the airflow that is by-passing the stack 12 if a higher anode velocity is desired or if a minimum pressure bias is violated. For example, if the stack 12 is operating at low power during an extended idle it may be desirable to increase the anode channel velocity to increase the amount of anode water purged during each bleed cycle. Anode purge request 54 can be model based on anode water accumulation or heuristic based. If an anode purge is required, then the airflow would increase just before the bleed and decrease back to nominal flow after the bleed.

In another non-limiting embodiment, the proposed BTE algorithm can improve the freeze start capability of the fuel cell system. During freeze starts, cold temperatures cause stack product water to condense, where the cathode operates with a high cathode airflow to remove water from the cathode flow channels. The condensed water migrates to the anode and may cause cell instability. The BTE algorithm takes advantage of the excess air on the cathode side of the stack 12 to maximize the bleed velocity during the anode bleed to improve stack stability during the bleed.

Figure 3:
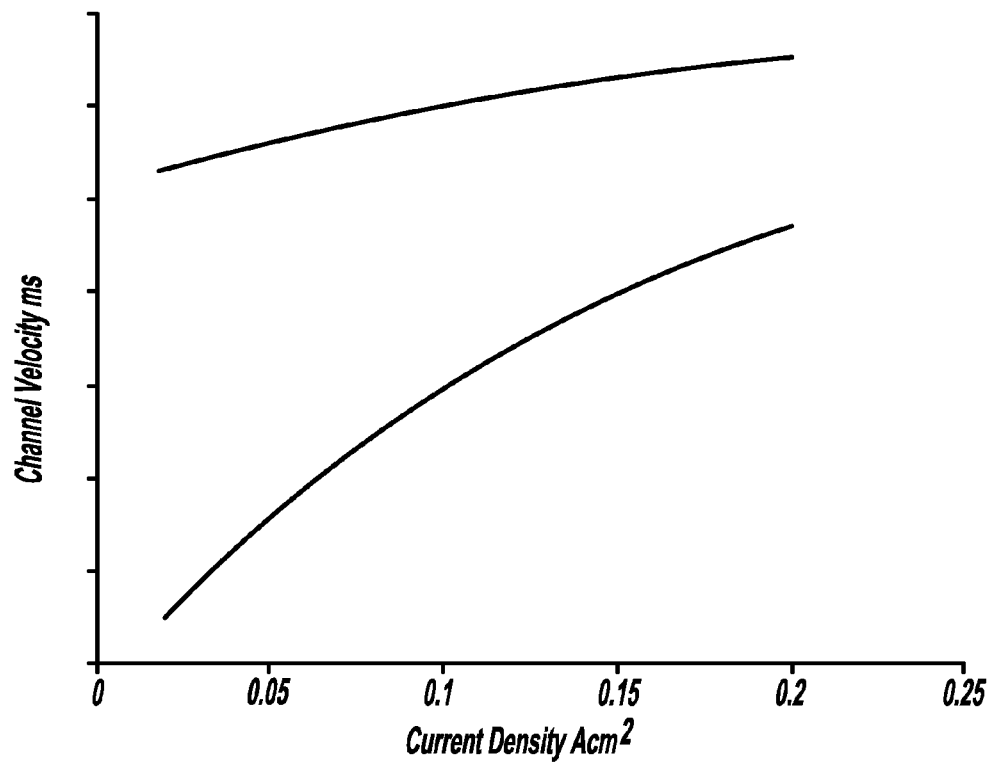
FIG. 3 is a graph illustrating the results and impact on anode flow channel velocity using the algorithm shown in FIG. 2.

FIG. 3 is a graph with current density on the horizontal axis and anode channel velocity on the vertical axis. The upper line represents the anode flow channel velocity achieved using the model based approach of the invention, and the lower line represents the anode channel velocity achieved using the look-up table method. This graph illustrates that at low power a much higher anode channel velocity can be tolerated without violating emissions using the model based approach. It is advantageous to increase anode channel velocity to the highest tolerable limit because the increase in velocity helps force water out of the anode flow channels.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining a flow rate of an anode exhaust gas through an anode bleed valve from an anode side of a fuel cell stack, said method comprising:
   estimating a bleed flow rate of the anode exhaust gas through the bleed valve that maintains a hydrogen concentration in the anode exhaust gas below a predetermined percentage based on the amount of air in a cathode output from the fuel cell stack, said bled anode exhaust gas being fed into the cathode output from the fuel cell stack;
   using a valve orifice model for the bleed valve to estimate an anode side pressure set-point that is necessary to supply the estimated bleed flow rate; and
   providing hydrogen to the anode side of the fuel cell stack that maintains the anode side pressure set-point.

2. The method according to claim 1 wherein the predetermined hydrogen concentration is less than 4%.

3. The method according to claim 2 wherein the predetermined hydrogen concentration is about 2.5%.

4. The method according to claim 1 wherein estimating the bleed flow rate includes using the equation:

$$y_{H2}^{exh} = \frac{y_{H_2} \cdot \dot{n}_{H_2}}{\dot{n}_{Air} + y_{H_2} \cdot \dot{n}_{H_2}} \leq y_{H2}^{exh\_desired}$$

where, $y_{H2}^{exh\_desired}$ is the predetermined hydrogen concentration, $y_{H2}^{exh}$ is the flow rate of hydrogen, $y_{H2}$ is the hydrogen concentration in the anode, $\dot{n}_{Air}$ is the molar flow rate of air in the cathode output and $\dot{n}_{H_2}$ is the bleed flow rate.

5. The method according to claim 4 wherein the valve orifice model is defined as:

$$k_v = 4.633 \cdot n \cdot \sqrt{\frac{MW_n \cdot T}{(p_1^2 - p_2^2)}}$$

where, $k_v$ is an orifice constant, n is the molar flow through the orifice, $MW_n$ is the molecular weight of gas, $p_1$ is the pressure at the inlet of the orifice, $p_2$ is the pressure at the outlet of the orifice and T is the temperature of the orifice.

6. The method according to claim 5 wherein the anode side pressure set-point is determined by rearranging the valve orifice model as:

$$\Delta_{P_{SP}} = \sqrt{p_2^2 + \left(\frac{4.633 \cdot \dot{n}_{H_2}}{k_v}\right)^2 \cdot MW_n \cdot T} - p_2$$

where the pressure set-point $\Delta_{P_{SP}}$ is the inlet pressure of the orifice $p_1$ and the molar flow through the orifice n is the bleed flow rate $\dot{n}_{H_2}$.

7. The method according to claim 1 wherein a portion of the compressor air by-passes the fuel cell stack and is sent directly to the cathode output to be mixed with the anode exhaust gas.

8. The method according to claim 1 further comprising using excess air flow from a cathode side of the fuel cell stack during freeze conditions to maximize the bleed flow rate during the anode exhaust gas bleed to improve stack stability.

9. A method for determining a flow of an anode exhaust gas from an anode side of a fuel cell stack, said method comprising:
   providing air from a compressor to a cathode side of the fuel cell stack;
   by-passing some of the air from the compressor around the fuel cell stack;
   determining how much anode exhaust gas can be output from the fuel cell stack and be mixed with compressor air that is provided to the cathode side and bypassed around the fuel cell stack that will maintain the amount of hydrogen in the mixed anode exhaust gas and air below a predetermined hydrogen concentration; and
   providing hydrogen to the anode side of the fuel cell stack that maintains an anode side pressure set-point for the determined amount of anode exhaust gas.

10. The method according to claim 9 wherein determining how much anode exhaust gas can be output from the fuel cell stack includes estimating a bleed flow rate of the anode exhaust gas through a bleed valve.

11. The method according to claim 10 wherein determining how much anode exhaust gas can be output from the fuel cell stack includes using a valve orifice model for the bleed valve to determine the anode side pressure set-point that is necessary to supply the estimated bleed flow rate.

12. The method according to claim 11 wherein estimating the bleed flow rate includes using the equation:

$$y_{H2}^{exh} = \frac{y_{H2} \cdot \dot{n}_{H2}}{\dot{n}_{Air} + y_{H2} \cdot \dot{n}_{H2}} \leq y_{H2}^{exh\_desired}$$

where, $y_{H2}^{exh\_desired}$ is the predetermined hydrogen concentration, $y_{H2}^{exh}$ is the flow rate of hydrogen, $y_{H2}$ is the hydrogen concentration in the anode, $\dot{n}_{Air}$ is the molar flow rate of air in the cathode output and $\dot{n}_{H_2}$ is the bleed flow rate.

13. The method according to claim 12 wherein the valve orifice model is defined as:

$$k_v = 4.633 \cdot n \cdot \sqrt{\frac{MW_n \cdot T}{(p_1^2 - p_2^2)}}$$

where, $k_v$ is an orifice constant, n is the molar flow through the orifice, $MW_n$ is the molecular weight of gas, $p_1$ is the pressure at the inlet of the orifice, $p_2$ is the pressure at the outlet of the orifice and T is the temperature of the orifice.

14. The method according to claim 13 wherein the anode side pressure set-point is determined by rearranging the valve orifice model as:

$$\Delta_{P_{SP}} = \sqrt{p_2^2 + \left(\frac{4.633 \cdot \dot{n}_{H_2}}{k_v}\right)^2 \cdot MW_n \cdot T} - p_2$$

where the pressure set-point $\Delta_{P_{SP}}$ is the inlet pressure of the orifice $p_1$ and the molar flow through the orifice n is the bleed flow rate $\dot{n}_{H_2}$.

15. The method according to claim 9 wherein the predetermined hydrogen concentration is less than 4%.

16. A system for determining a flow rate of an anode exhaust gas through an anode bleed valve from an anode side of a fuel cell stack, said system comprising:
   means for estimating a bleed flow rate of the anode exhaust gas through the bleed valve that maintains a hydrogen concentration in the anode exhaust gas that is bled from the fuel cell stack below a predetermined percentage based on the amount of air in a cathode output from the fuel cell stack, said bled anode exhaust gas being fed into the cathode output from the fuel cell stack;
   means for using a valve orifice model for the bleed valve to estimate an anode side pressure set-point that is necessary to supply the estimated bleed flow rate; and
   means for providing hydrogen to the anode side of the fuel cell stack that maintains the anode side pressure set-point.

17. The system according to claim 16 wherein the means for estimating the bleed flow rate uses the equation:

$$y_{H2}^{exh} = \frac{y_{H2} \cdot \dot{n}_{H2}}{\dot{n}_{Air} + y_{H2} \cdot \dot{n}_{H2}} \leq y_{H2}^{exh\_desired}$$

where, $y_{H2}^{exh\_desired}$ is the predetermined hydrogen concentration, $y_{H2}^{exh}$ is the flow rate of hydrogen, $y_{H2}$ is the hydrogen concentration in the anode, $\dot{n}_{Air}$ is the molar flow rate of air in the cathode output and $\dot{n}_{H_2}$ is the bleed flow rate.

18. The system according to claim 17 wherein the valve orifice model is defined as:

$$k_v = 4.633 \cdot n \cdot \sqrt{\frac{MW_n \cdot T}{(p_1^2 - p_2^2)}}$$

where, $k_v$ is an orifice constant, n is the molar flow through the orifice, $MW_n$ is the molecular weight of gas, $p_1$ is the pressure at the inlet of the orifice, $p_2$ is the pressure at the outlet of the orifice and T is the temperature of the orifice.

19. The system according to claim 18 wherein the means for providing hydrogen to the anode side of the fuel cell stack determines the anode side pressure set-point by rearranging the valve orifice model as:

$$\Delta_{P_{SP}} = \sqrt{p_2^2 + \left(\frac{4.633 \cdot \dot{n}_{H_2}}{k_v}\right)^2 \cdot MW_n \cdot T} - p_2$$

where the pressure set-point $\Delta_{P_{SP}}$ is the inlet pressure of the orifice $p_1$ and the molar flow through the orifice n is the bleed flow rate $\dot{n}_{H_2}$.

20. The system according to claim 16 further comprising a compressor that provides cathode air, wherein a portion of the compressor air by-passes the fuel cell stack and is sent directly to the cathode output to be mixed with the anode exhaust gas.

* * * * *